United States Patent Office 3,313,869
Patented Apr. 11, 1967

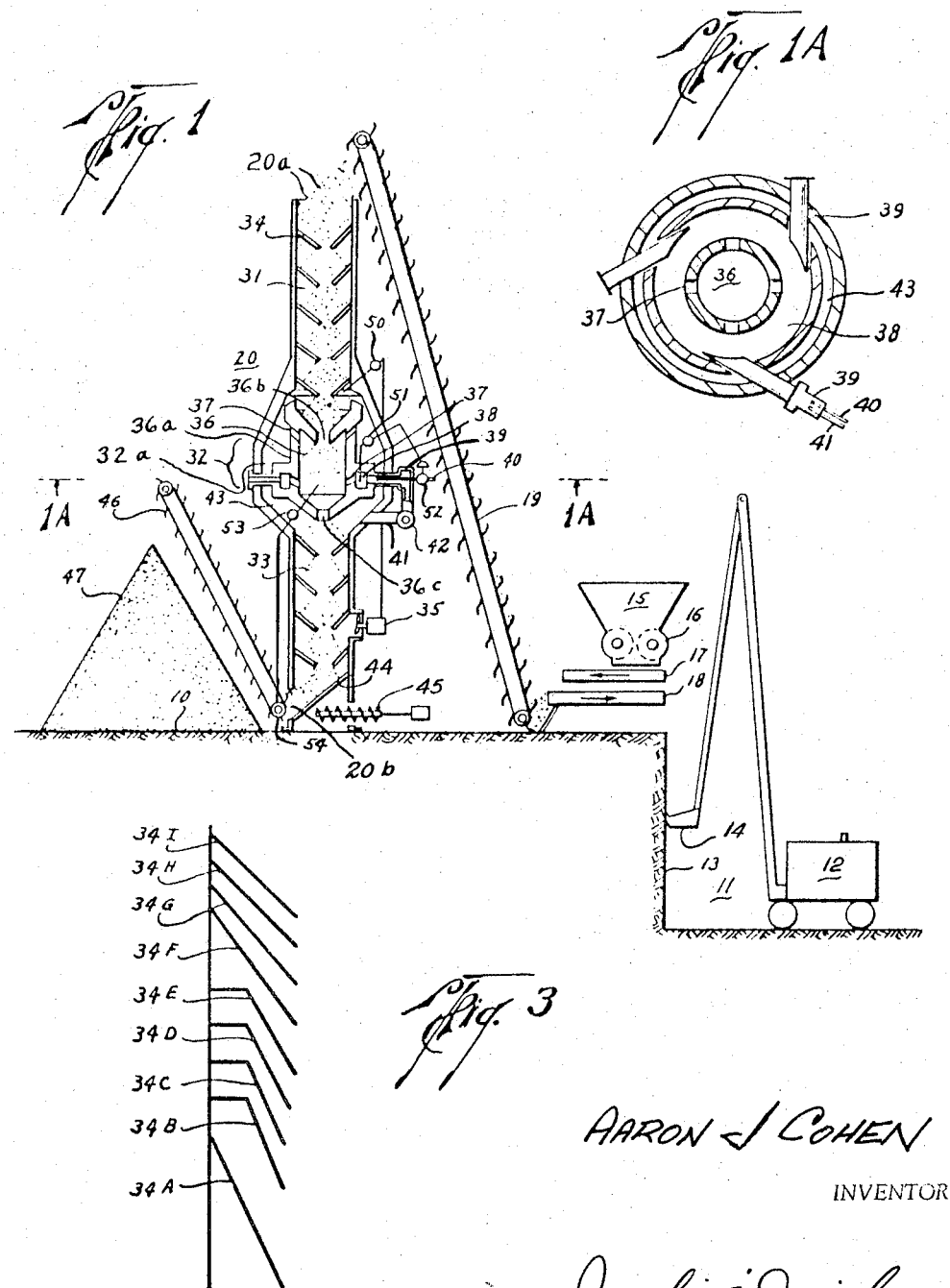

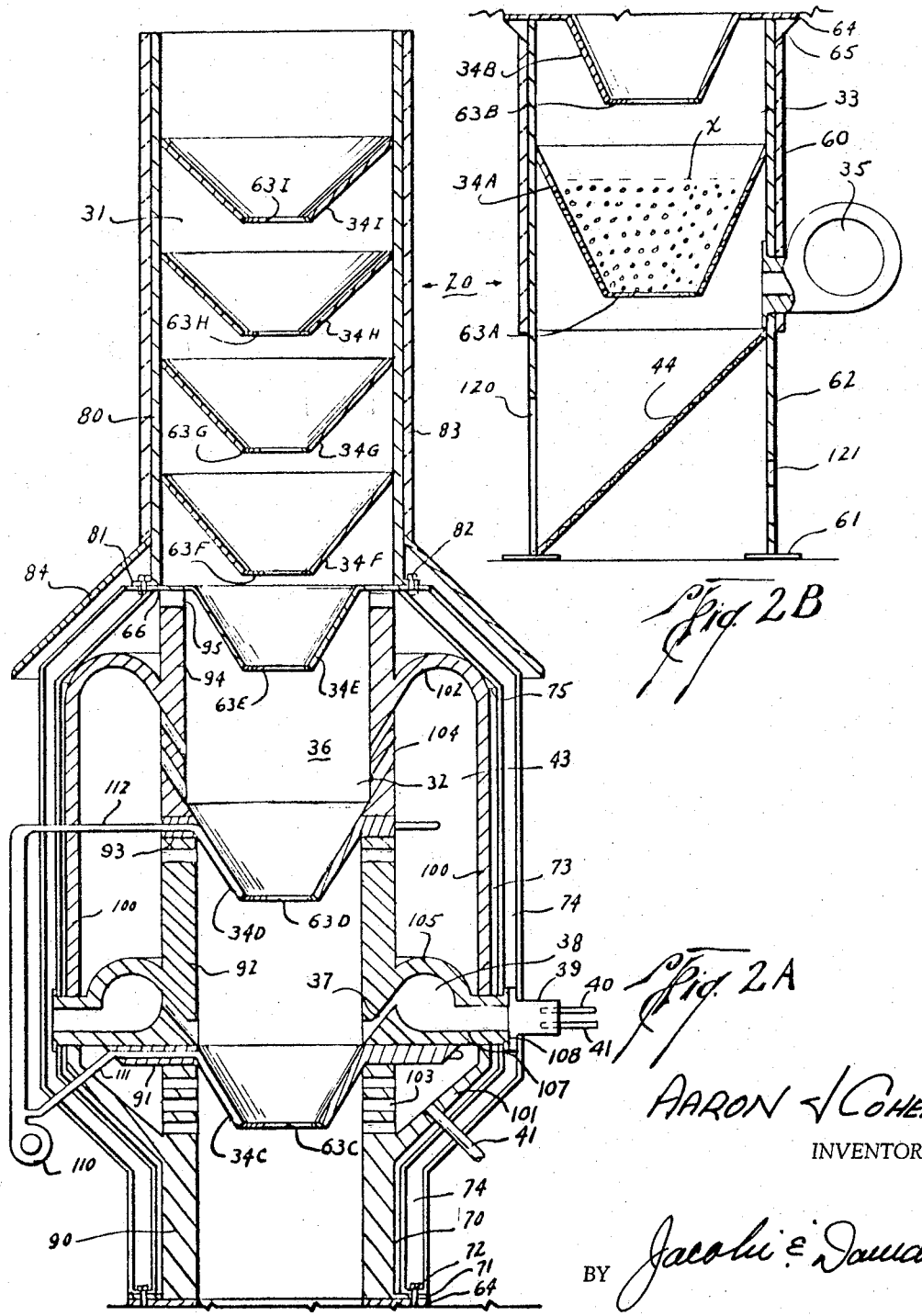

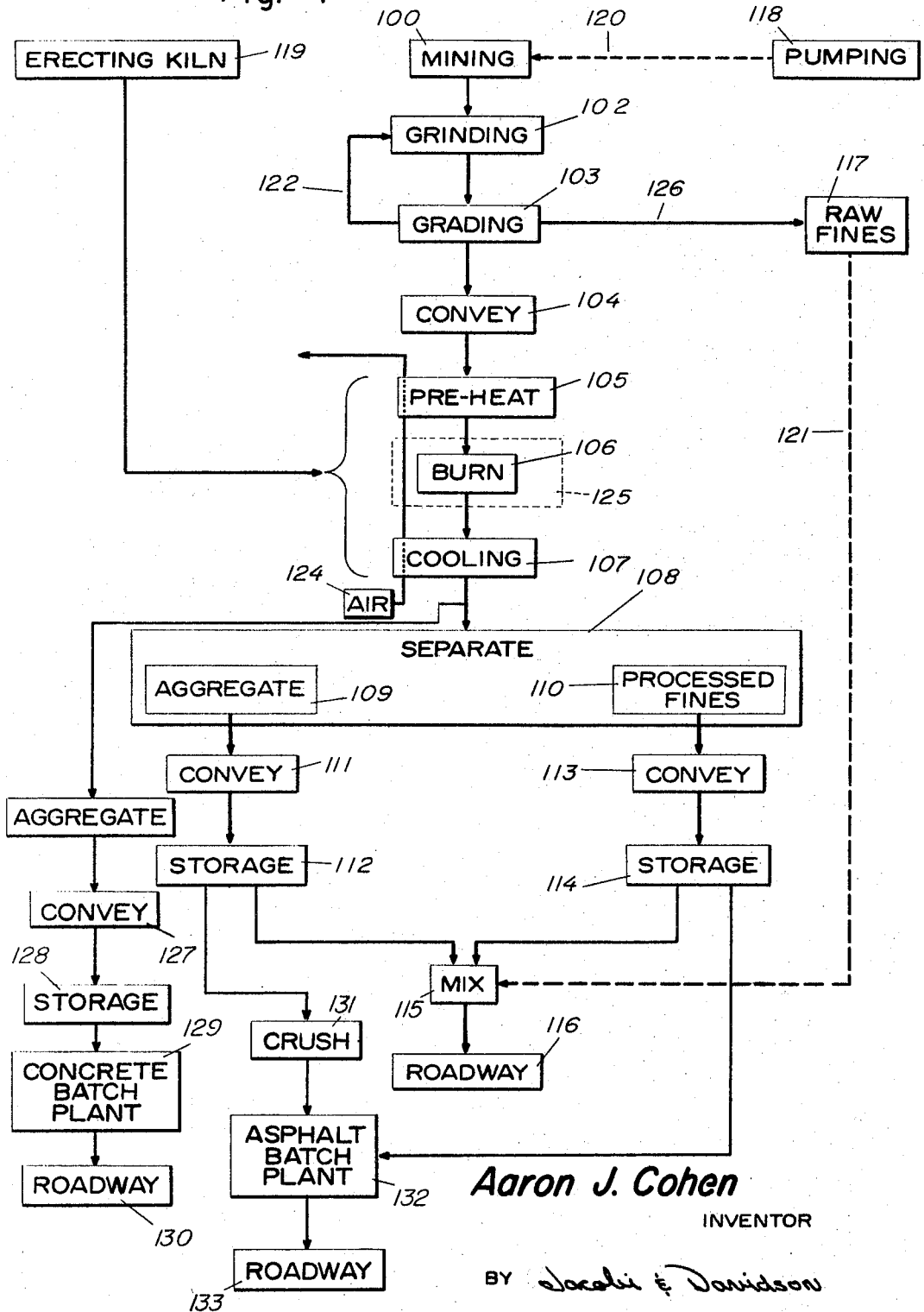

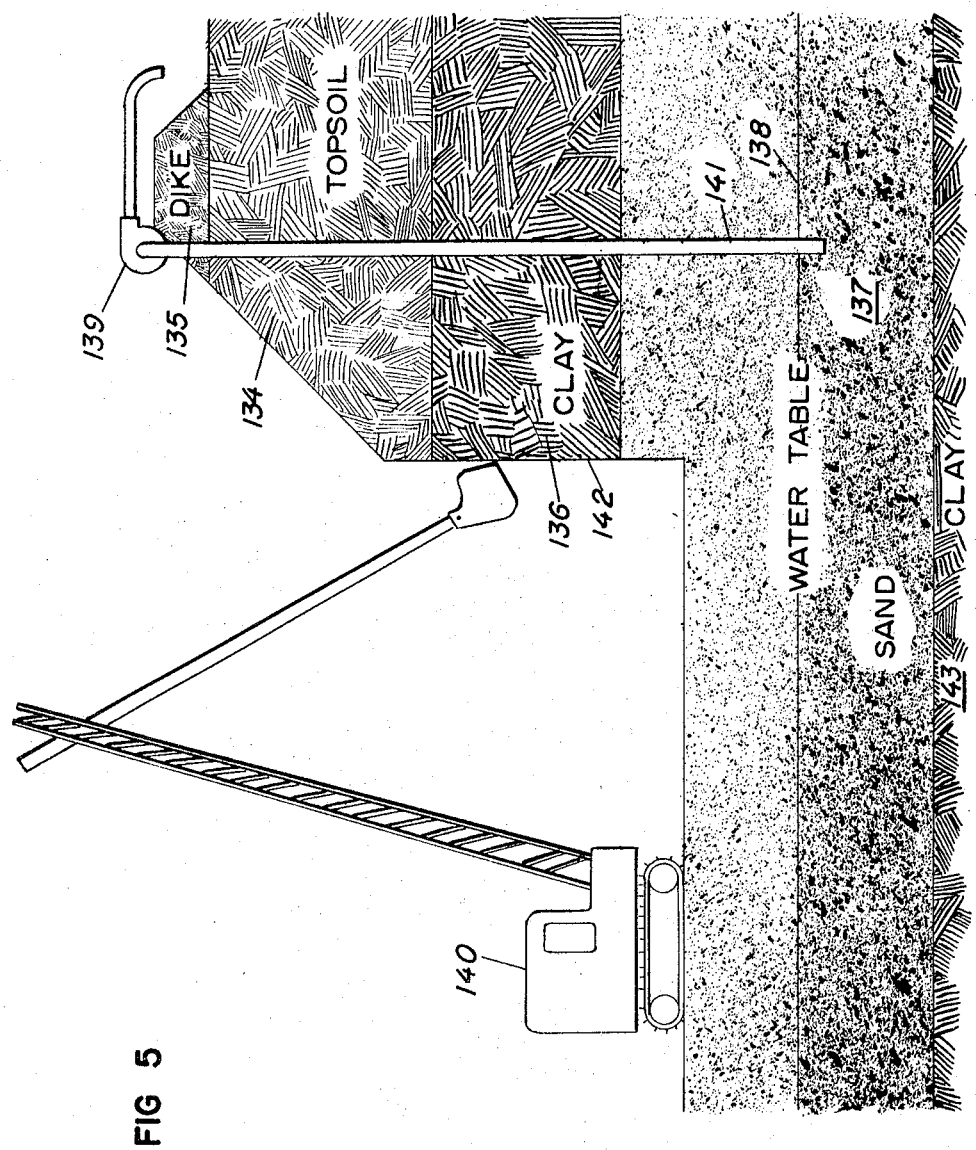

3,313,869
METHOD OF MAKING CLAY AGGREGATE
FROM RAW CLAY
Aaron J. Cohen, 3607 S. Braeswood,
Houston, Tex. 77025
Filed Aug. 7, 1963, Ser. No. 300,594
15 Claims. (Cl. 263—52)

This application is a continuation-in-part of co-pending application Ser. No. 42,155, filed July 11, 1960, now Patent No. 3,140,865.

This invention relates to novel and useful methods of treating raw clay to form clay aggregate therefrom suitable for use in flexible road beds, and/or concrete products.

Along many roadways over which a road is to be constructed, there exist so-called "clay pits." Many of these clay pits include raw or fresh clay disposed above the local water table. Where the clay does not exist in natural condition above the water table, the water table can be lowered by pumping well points. Moreover, water-sand deposits can be pumped dry so as to make sub-strata clay deposits useable. Thus, it is possible to choose at spaced locations along a right-of-way or adjacent a building project, raw clay of low-moisture content, i.e., a moisture content preferably below 25%.

As is well known to those familiar with construction, and/or those familiar with devices for processing raw clay, the clay as existent in nature in a clay pit is not readily adapted for direct use in providing a flexible road bed or concrete aggregate. Accordingly, it is necessary to treat the raw clay to form therefrom an aggregate of suitable hardness and size.

Consistent with the foregoing, the present invention has as one of its primary objects the provision of a method of treating raw clay to form clay aggregate therefrom suitable for use in flexible road beds, and/or concrete products. Such method provides for the use of a multichamber shaft-type kiln for progressively drying, burning, and cooling clay particles, and the method is such that the kiln can be constructed so as to easily be transported from location to location for use comparatively close to the location at which the clay processed therein is to be used. More generally, one of the primary objects of the present invention is to provide a method of treating raw clay "on site" so as to eliminate substantial transportation costs and take advantage of the raw material existent along or adjacent a right-of-way on which a road is to be constructed, and/or adjacent a building project.

Still further, it is an object of the present invention to provide a method of treating raw clay conforming with the preceding objects, but in accordance with which the need for any substantial or time-consuming air drying of the raw clay is eliminated.

Still further, yet additional and important primary objects of the present invention are to provide a method for treating raw clay in a multichamber shaft-type kiln by progressively carrying out the steps of drying, burning, and cooling clay particles: (a) wherein because of the method hereof, the kiln can be constructed in separable sections adapted to be coupled in vertical alignment to provide for successive steps of drying, burning and cooling of the particles processed therein; and (b) wherein the method efficiently results in an output of aggregate suitable for use in concrete, and free of any fines as well as any quicklime.

Other, yet more specific objects of the present invention are: (a) to provide such a method which can operate with base materials naturally existent along the proposed roadway at a comparatively low cost, and yet which provides suitable clay aggregate for use in flexible road beds equal in quality to other known materials; (b) to provide a method of processing raw clay which can be carried out in close proximity to the proposed roadway or construction project thereby permitting the mining and use of such clay as it naturally exists at the site of the work; (c) to provide a method of processing raw clay, which permits the use of clay that has been dried in its natural state within a clay pit by exposure to the air and, if necessary, by a lowering of the water table in the area surrounding the clay pit; (d) to provide a method of treating raw clay to form clay aggregate therefrom suitable for use in flexible road beds or concrete, which method eliminates the otherwise added cost and manpower necessary to transport materials and equipment to the proposed construction; and (e) to provide a method of treating raw clay to form a suitable material which can be substituted for gravel in cementitious mixes.

The invention will be better understood, and objects other than those set forth above will become apparent when consideration is given to the following detailed description of the method and apparatus for carrying out such method. Such description makes reference to the annexed drawings presenting preferred embodiments hereof.

In the drawings:

FIGURE 1 is a schematic vertical section taken through a kiln for use with the present method and presents in side elevation apparatus associated with the kiln in normal operation thereof;

FIGURE 1A is a fragmental horizontal sectional view taken on the line 1A—1A of FIGURE 1 and showing the preferred arrangement and disposition of cooperating combustion chamber and burning chamber components incorporated in the kiln of FIGURE 1;

FIGURES 2A and 2B together provide a vertical section through a modified kiln for use with the present method, FIGURES 2A and 2B being drawn to a larger scale than FIGURE 1;

FIGURE 3 is a schematic fragmental vertical sectional view taken partially through one side of the kiln of FIGURES 2A, 2B, FIGURE 3 showing a preferred variable angle disposition of baffles incorporated within a kiln used in accordance with the present method;

FIGURE 4 is a schematic flow chart showing the sequence of steps in the present method; and FIGURE 5 is a vertical sectional view of a mining site, and shows various strata at the site, and the manner in which mining equipment can be used according to the invention to extract useful clay from such strata.

The methods provided by the instant invention for forming raw clay into an aggregate suitable for use in flexible road beds, suitable for use in concrete mixtures, suitable for use in asphalt mixtures, and/or suitable for use in connection with the provision of stablized surfaces generally have certain common characteristics. In each instance, there is a production line type of sequential operation with continuity throughout the several steps being performed.

Notwithstanding the above, there are certain factors which usually result in variations of the method depending on the use to which the final product is put. Accordingly, it is helpful in understanding the invention to initially consider a complete sequence of steps for the formation of one product; in this instance, aggregate for a flexible road bed. With an understanding of a complete sequence as related to this product, one can then easily understand the variations as related to the formation of raw clay suitable for use in concrete and asphalt aggregates, and as related to alternate raw clay mining procedures.

*Method—Flexible roadbed aggregate*

The preferred method of treating raw clay to form the same into an aggregate suitable for use in flexible road-beds can be initially understood from the following description of the included steps. Such steps are presented in sequence in the exemplary flow chart of FIGURE 4.

A suitable clay pit is chosen along the proposed roadway. Preferably, the moisture content of the clay therein will not exceed 25%. However, when the moisture content exceeds the desired percentage, the surrounding water table is lowered by a pumping operation (box 118). Such operation can be carried out prior to the mining of raw clay from the pit and consequently the pumping step (box 118) is shown at a higher level than the mining operation (box 100) and as connected thereto by dotted line 120. The raw clay on the side walls of the pit is exposed to the air for preliminary drying. The mining of the raw clay is carried out in a unique manner wherein mining apparatus progressively removes the clay around the periphery of the pit. The kiln is erected (box 100) after the pit is prepared and the water pumped out (box 118). The mining operation (box 100) is continuously carried out simultaneously with the burning operation (box 106). This is unique since no storage air drying operation is required as otherwise customary.

The mined clay is then put through a grinding operation (box 102) so as to reduce it into clay-bits of predominantly a given range. Such operation can be carried out, for example, in a conventional pug mill of the type employing two coaxial rollers rotating downwardly toward each other with a space therebetween. The necessity of having raw clay with a moisture content less than 25% becomes apparent when considered in light of the grinding operation (box 102). The downward force exerted by the coaxial rollers on the raw clay would result in a clay extrusion if the moisture content of the raw clay should exceed 25%. It is necessary therefore to reduce the moisture in the raw clay to the specified percentage so that clay bits are produced from the forces exerted by the coaxial rollers on the mined clay.

From the grinding operation (box 102), the clay bits are then graded (box 103) into a selected range of sizes preferably between one-fourth inch and one and one-half inches. Those bits which have a size beyond the end of the desired range are recycled through the grinding operation as indicated by line 122. The raw clay fines having a size below the desired range are passed (line 126) to storage (box 117) as for use, if desired, in a later mixing operation described below. This grading operation (box 103) can be carried out, for example, through the use of spaced screens mounted below the discharge outlet of the grinding apparatus and having respective meshes at the upper and lower end of the desired range.

Following the grading operation (box 103), the selected clay bits are then conveyed (box 104) to the top of the previously erected kiln and discharged into the inlet port thereof. The clay bits are progressively pre-heated (box 105), burned (box 106) and then cooled (box 107) in respective areas of said kiln by passing therethrough in a gravity controlled descent along a zig-zag path.

During the pre-heating (box 105), burning (box 106) and cooling (box 107) operations and simultaneous therewith, an air flow (box 124) is forced into the cooling area of said kiln. The air flow initially travels counter-current to the clay bits being cooled (box 107), then around the bits burned (box 106) but in heat transfer relation thereto (as indicated by the phantom box at 125). The air flow then continues to pass upwardly through the bits being pre-heated (box 105).

The purpose of the forced air flow is three-fold. Firstly, the forced air passing upwardly through the cooling area of the kiln and clay bits therein absorbs from the clay bits the heat retained in the clay-bits after the burning operation (box 106). The temperature of the clay bits leaving the cooling area should be less than 350° F., and preferably does not exceed 500° F. Secondly, the forced air passing around the burning area and clay bits therein, but in heat transfer relation thereto, will absorb some of the heat from the burning area and thus reduce the temperature therein. The temperature in the burning area should be between 1800° F. and 2300° F., depending on the end use of the product. For example:

1800° F. will produce Flexible Roadbed Material
2000° F. will produce Fair Gravel Type Material With Lime
2200° F. will produce Good Gravel Type Material Without Lime
2300° F. will produce Excellent Gravel Type Material Without Lime.

The upwardly passing air will assist in maintaining this temperature by absorbing heat from the periphery of this area. Thirdly, as pre-heated by the cooled bits and the absorption from the burning area, continues to flow upwardly through the pre-heating area of the kiln (box 105) and thereby gives off its heat to the clay bits therein, for the pre-heating operation. The temperature of the clay bits should be pre-heated by the air flow to a temperature of between 300° F. and 400° F., but at least to a minimum of 225° F., before entering the burning area.

At the conclusion of the gravity controlled descent of the clay bits, they are subjected to a separation operation (box 108) in which the clay aggregate (box 109) is separated from any fines (box 110) which have passed with the bits through the previous processing operations. Such fines result from the clay bits contacting one another during the descent through the various sections of the kiln and also from the contact of the clay bits with the interior walls and retaining baffles of the kiln. These fines, in fact, were initially part of the clay bits conveyed (box 104) to the top of the kiln. The aggregate (box 109) is conveyed (box 111) to a storage area (box 112) and the processed fines (box 110) are conveyed (box 113) to their respective storage area (box 114). This separation of bits and fines can be carried out, for example, through the use of a suitable mesh screen.

When the road construction crew arrives at the process site, it then mixes (box 115) predetermined amounts of clay aggregate (box 109), and/or processed fines (box 119) and/or clay fines (box 117) which are brought from their storage area (line 121). If desired, alternatively, the processed clay bits may be used alone. Other desirable materials may also be mixed therewith to provide the ultimate flexible roadbed (box 116).

After sufficient amounts of aggregate and fines are processed, the kiln is disassembled and transported to a new site further along the proposed roadway for again carrying out the aforementioned operations.

*Method—Concrete material*

The steps described above are substantially similar in the processing of raw clay for use in concrete. However, the temperature in the burning area will be raised to between 2100° F. and 2300°. The processed aggregate will be subsequently conveyed (box 127) to a storage area (box 128) and then to the concrete batch plant (box 129) for mixing with other desired materials. After the batch plant operation, the material is ready for the desired construction.

*Method—Asphalt material*

The above described steps, for treating raw clay are again substantially similar to those used in accordance herewith for processing raw clay to be used in asphalt material. However, in order to provide a smooth asphalt layer on the roadway, it is necessary to crush the processed aggregate (box 131) before it is mixed with the processed fines (box 110) in a batch plant (box 132). After the batch plant operation, the material is ready for application to the roadway (box 133).

*Method of mining raw clay*

It is to be understood that the aforementioned methods have included a mining operation wherein raw clay having a moisture content of less than 25% was removed from the ground. Where the situation is such that available raw clay lies below a sand strata and the water table, the following method is desirable for mining the raw clay.

After comprehensive soil tests have determined the clay formation, water table, and sand strata in the clay bed, the top layer of soil 134 is removed from an area of preferably between 20 to 200 feet in diameter depending on the volume of raw clay necessary for the desired construction. This top layer of soil will usually be approximately three feet in depth. As shown in FIGURE 5, a dyke 135 is constructed around the area so as to prevent the flow of surface water into the excavation. A plurality of wall points 141 are drilled approximately ten feet into the ground and conventional pumps 139 are provided for raising the water from the sand strata 137 and thereby lowering the water table 138 in the surrounding area.

Tests indicate that below the top soil layer 134, in a strata formation such as shown in FIGURE 5, lies a shallow level of raw clay 136 which has a moisture content of less than 18%. As long as the pump 139 continues to remove water from the sand strata and thereby lowering the water table in the surrounding area, the raw clay 136 will be dried to as low as a 13% moisture content. If an increased volume of raw clay is required, the sand strata 137, usually extending to a depth of ten feet, is removed so as to expose the lowermost level 143. The raw clay in this level will usually have a moisture content of less than 20% depending on the time duration of the pumping operation, and the area exposed above the clay level.

Conventional mining apparatus 140 would begin removing the raw clay from the side walls 142 of the excavation, and continue around the periphery thereof. As the hole gets larger, the mined clay will become progressively more dehydrated due to the time necessary for the mining apparatus 140 to complete one revolution of the area in removing the raw clay from the sides thereof. The size of the hole can be predetermined according to the quantity of raw clay required at the selected location. Several well points 141 may be required around the periphery of the hole, so that a sufficient amount of water is removed from the sand strata.

*Apparatus for carrying out method*

Desirable apparatus for carrying out the above described method is shown in FIGURES 1 through 2. The earth's surface is indicated at 10 and a clay pit at 11 in FIGURE 1. A crane 12 removes clay from a vertical side wall 13 of the pit with a scoop 14 and deposits it in hopper 15 of pug mill 16. The pug mill reduces the size of the raw clay fed into the hopper.

The pug mill may be of the type employing two coaxial rollers rotating downward toward each other with a space therebetween equal approximately to the desired size of the clay bits. The rollers may be provided with nonengaging knobs or teeth to grip the clay and force it to move down through the mill between rollers. The clay should have a moisture content less than about 25% so that it will not pass through the mill as a continuous plastic extrusion but will be broken up into bits. To determine the moisture content of the soil, a neutron moisture meter may be used. (See Soil Mechanics Review, No. 1, May 1959, prepared by McClelland Engineers, Inc., Houston, Tex.)

The reduced clay falls out of the bottom of the pug mill onto vibrating or reciprocating screens 17, 18. The material retained on the 1½″ screen 17 is returned to the hopper or to the pit. The material passing the ¼″ screen 18 is discarded. The material passing screen 17 and retained on screen 18 is of the desired range of sizes and is discharged onto conveyor 19. The reduced and size-graded clay bits are carried by the conveyor to the top of kiln 20 and discharged into the kiln.

The kiln 20 used in the prescribed method and as is apparent from the drawings is a multichamber shaft-type kiln and serves to progressively dry, burn, and cool clay particles. The kiln comprises an elongated hollow housing section having a particle inlet port 20a at the upper end thereof, and having a particle outlet port 20b at the lower end thereof. A burning chamber 36 is disposed within the housing section between and spaced from the ends 20a and 20b. The burning chamber 36 is located in the intermediate enlarger portion 32 of the housing section forming the kiln, and the outer side wall 36a of the chamber 36 is spaced interiorly from the adjacent wall 32a of the housing section. The spacing between the walls 36a and 32a forms a gas flow passageway 43 within the housing section, or portion 32 thereof, about the burning chamber 36.

The burning chamber 36 has a particle inlet port 36b at the upper end thereof, and a particle outlet port 36c at the lower end thereof. First baffle means, or baffles 34 are disposed within the upper portion 31 of the housing section between the inlet port 20a thereof and the inlet port 36b of the burning chamber. The baffles or baffle means 34 direct particles between the particle inlet 20a and the particle inlet 36b along progressive paths extending angularly to the longitudinal axis of the housing section, as explained more fully below.

Another or second baffle means is disposed within the lower portion 33 of the housing section between the outlet port 36c of the burning chamber and the outlet port 20b of the housing section. This other baffle means serves to direct particles between the outlet port 36c and the outlet port 20b also along progressive paths extending angularly to the longitudinal axis of the housing section.

A selectively operable conveyor means 46 is provided to remove particles from the housing section, or more particularly the outlet 20b thereof, i.e., particles that have progressively traversed the upper baffle means, the burning chamber, and the second baffle means. Still further, fan means 35 are provided for blowing air within the lower portion 33 of the housing section past the particles therein, through the passageway 43, and into the upper portion 31 of the housing section. Additionally, a combustion chamber 38 is incorporated and disposed within the passageway 43, the combustion chamber, as explained more fully below, serving as means for heating the chamber 36.

While the kiln 20 has been described above as having upper, middle, and lower portions 31, 32, and 33 respectively, such portions may just as well be described as sections. Accordingly, the kiln 20 would comprise, consistent with this alternate phraseology, three sections. The upper section 31 is the drying section. The middle section 32 is the burning section. The lower section 33 is the cooling section. As the clay bits fall through the series of baffles 34 in the kiln, they are contacted by the counter-flowing gases forced upwardly by fan means or blower 35. The bits are first dried by a mixture of hot air and hot gas in the dryer section. Then the bits are burned in the burning chamber or oven 36 forming the interior of the burner section. Hot gas enters the oven through ports 37 from the combustion chamber annulus 38.

The hot gas from the combustion chamber 38 is the product of combustion from burners 39 to which are fed fuel gas and air. As best shown in FIGURE 1A, the burners are tangentially directed relative to the combustion chamber torus to prevent burn-out of the side walls of the torus and to give more even heat distribution. As shown in FIGURE 1, and schematically in FIGURE 1A, the burners are fed fuel gas through pipe 40 leading to a source not shown and preheated air drawn off from the kiln through pipes 41 by suction fan 42. The preheated air drawn through pipes 41 is but a small portion of the air coming from the cooling section below where the burnt clay bits are brought to a handling temperature. The large remaining portion of the air flowing up the cooling section passes through the passageway 43 around the burning chamber and joins the products of combustion flowing up the dryer section.

It will be noted that the burning chamber 36 and combustion chamber 38 are disposed within the enlarged portion 32 of the kiln, and it will be remembered that a passageway 43 extends about the combustion chamber and the burning chamber. By virtue of this construction, air passing from the lower portion or section 33 of the kiln travels in cooling relation to the burning chamber and combustion chamber through the central portion or section of the kiln and into the upper or dryer section thereof. Accordingly, clay bits in the upper portion of the kiln are dried by the hot gases rising not only through the inlet port 36b of the burning chamber, but also by the gases rising from the lower portion of section 33 of the kiln and passing around and about the burner chamber and combustion chamber during passage through the passageway 43.

At the bottom of the kiln, the fines fall through ¼" screen 44 and may be removed therefrom by a helical conveyor 45 either continuously or at intervals. The burnt clay aggregate collecting on the screen falls onto conveyor 46 which discharges into stock pile 47 or into a truck or railway car as desired.

The air forced into the kiln by the blower and travelling upwardly through the cooling section of the kiln not only cools the burnt clay but absorbs heat from the clay which increases the effectiveness of the air in the burning and drying sections. The hot air from the cooler and the hot gases from the burner convert the water in the raw clay entering inlet port 20a into steam which rises through the dryer section and goes out the top of the kiln along with the air and gaseous products of combustion.

The entire process is very simply controlled by temperature controls at three points. The temperature of the gases (air and products of combustion) entering the dryer is controlled by thermostat 50 located in the air space just below the bottom baffle of the dryer, the thermostat controlling the speed of blower 35 which may have an outlet pressure of around 5 p.s.i. The temperature of the burner is controlled by thermostat 51 located in the combustion chamber annulus, thermostat 51 controlling the degree of opening of fuel gas valve 52 in pipe 40. The temperature of the finished product is controlled by thermostat 53 located, in the bottom e.g., of the oven where it is covered with clay bits, thermostat 53 controlling the starting and (by a timer) the stopping of the drive motor 54 for conveyor 46. The clay bits will usually be in the oven part of the kiln about 2 hours.

Referring now to FIGURES 2A and 2B, there is shown in detail a form of kiln generally similar to the kiln 20 shown schematically in FIGURE 1. The lower or cooling section 33 of the kiln comprises a tubular metal shell 60 having a ring 61 at its lower end. The shell is covered on its outside with thermal material such as an asbestos wrapping 62. Inside the shell is affixed, e.g. by welding, a conical baffle 34A having a central opening 63 and having circular perforations of the order of ¼" in diameter (or equivalent slots) covering around 50% of the area of the baffles between the bottom opening 63a and line "X" demarcating the outer lower periphery of a pile of clay bits extending up to the bottom of baffle 34b thereabove. Baffle 34b is similar to baffle 34a, being conical and having a lower opening 63b and being similarly perforated; however, the part of the baffle above the perforated area is flared outwardly horizontally to provide a flange 64 supporting the baffle on top of the shell 60. Flange 64 is supported by and secured to gusset plates 65 welded on the outside of the shell 60.

It will be appreciated that the baffles or baffle means 34 shown in FIGURE 1 preferably correspond to the baffles described in this paragraph which specifically relates to FIGURE 2.

The middle or burner section 32 comprises a metal shell 70 having an outturned flange 71 at its lower end resting upon and suitably fastened to flange 64, e.g., by bolts 72. The central part of shell 70 bulges outwardly or is diametrically enlarged at 73. Shell 70 is provided on its exterior with a plurality, e.g., six, supporting I-beam ribs 74 spaced apart around its periphery. The ribs flare outwardly at the middle portion of the burner section to follow the bulging diametrically enlarged midportion 73 of the shell, and converged above the upper edge 75 of the shell, returning to the same diameter as shell 60. To the upper ends of the ribs 74 is affixed the outturned horizontal flange 75 of a baffle 34e similar to baffle 34b.

The upper or drying portion or section of the kiln comprises a metal shell 80 having a lower outturned flange 81 resting on flange 75 and secured thereto, e.g. by bolts 82. The exterior of shell 80 is covered with thermal insulation, e.g. asbestos wrapping 83. Around the lower periphery of shell 80 there is secured a conical skirt 84 providing a rain shield for the lower part of the kiln. Within shell 80 are secured a series of conical perforated baffles 34f–l similar to baffle 34a, all open at their lower ends.

Within the tube 70 of the burner section and resting on flange 64 is disposed a cylindrical wall 90 of fire brick or similar refractory material. The wall 90 extends straight up to the lower part of the bulging or enlarged portion 73 of shell 70. Supported on top of wall 90 is the horizontally outwardly extending flange 91 of conical baffle 34c. On top of flange 91 is a further cylindrical wall 92 of refractory material similar to wall 90. Wall 92 extends about half way up the inside of enlarged portion 73 of shell 70. On top of wall 92 is the horizontally outwardly extending flange 93 of conical baffle 34d. On top of flange 33 is a further cylindrical wall 94 of refractory material similar to walls 90 and 92. On top of wall 94 is a cylindrical expansion joint 95 of asbestos, extending up snugly between flange 66 of baffle 34e.

The interior of diametrically enlarged portion 73 of shell 70 is covered with refractory material 100 which connects with wall 90 by a conical portion 101 and with wall 94 by an arching portion 102. The by-pass annulus or gas flow passageway 43 is formed between wall means 90, 92, 94 and the refractory lining 100 of enlarged portion 73 of shell 78. Ports 103 in wall 90 provide inlets from the cooler section 33 to the passageway or by-pass annulus 43 and downwardly directed ports 104 provide outlets from the passageway or by-pass annulus 43 to the top of the oven 36 formed inside the burner section by walls 90, 92, 94 and expansion joints 95.

Within passageway or by-pass annulus 43 is disposed refractory torus 105 forming combustion chamber 38. Downwardly directed ports 37 provide outlets from the combustion chamber whereby the hot products of combustion can enter the lower mid-part of the oven just above baffle 34c through the communication provided by such ports 37. Pipes 107 extend tangentially outwardly from the combustion chamber to enlarged portion 73 of shell 70 and terminate in flanges 108. Gas burners 39 are attached to flanges 108 by any suitable means (e.g. bolts). Air for the burners is withdrawn from the lower part of the passageway 43 through pipe 41 by a blower 42 (see FIG. 1).

The series of baffles 34a, b, e–l, are all perforated like baffle 34a and all the baffles 34a–l are of truncated conical or frustro-conical shape. As best shown in FIGURE 3, the angles of inclination of the baffles vary, being about 45 degrees at top baffle 34l and increasing to about 60 degrees at baffle 34a, such angle being taken with respect to the adjacent interior wall of the particular kiln section or portion, or otherwise phrased, with respect to the interior wall of the housing section. The central openings where the cones are truncated are of variable size. The diameter of the central holes 63c–l of the dryer and burner sections are about three-tenths the inner diameter of the tube 70 while the openings 63a–b in the cooler section are about four-tenths that diameter. This contrasts with the uniform angle and central openings of baffles 34 of FIGURE 1.

Baffles 34c and d are double walled leaving an interior space through which air is blown to cool them. The air is provided by a blower 110 whose intake is connected to atmosphere and which discharges through pipes 111, 112 into the horizontal flange portions of the baffles. The baffles 34c and 34d, and any other baffles if desired, are further protected by an adhered coating of refractory fused material such as aluminum oxide, or chrome oxide which can be applied to the baffles with an acetylene torch or an electronic plasma torch. The baffles are then vacuum impregnated with suitable resins so as to make the oxide coating pin-hole free and extremely hard. The hardness of the chrome oxide coating is exemplified by the fact that it can be ground with tungsten carbide and it requires diamond tools to grind aluminum oxide.

Although basic structural aspects of kilns constructed in accordance with the present invention for use with the prescribed method have been discussed in detail in the preceding paragraphs, there are other structural features incorporated in a kiln constructed in accordance with the preferred embodiment hereof. More particularly, by again referring to FIGURE 1, it will be noted that the top and bottom walls of the particle burning chamber 36 are frusto-conical in contour, and that the taper thereof is in the downward direction. Each of the walls terminate in the respective inlet and outlet openings 36b and 36c of the burning chamber. The top and bottom walls of the burining chamber shown in FIGURE 1 correspond to the baffles designated by the numerals 34c and 34d, respectively, in FIGURE 2A. At least these particular baffles, as noted above, are preferably air-cooled. Moreover, the baffles in the burner chamber, and also other baffles incorporated if desired, are also coated as described above to prevent them from oxidizing and to thermally insulate them. The coating, as indicated above, is either aluminum oxide or chrome oxide.

Preferably, the only baffles of the burning chamber are the top and bottom walls thereof since heat is transferred largely by radiation at the high burner temperature so that contacting of the product with the hot gas is unnecessary. A larger number of baffles is incorporated in the dryer section of the kiln in order to effect maximum transfer of the heat from the hot gases to the clay bits or particles passing therethrough. Moreover, sufficient baffles are provided in the cooler section of the kiln to insure that the product is uniformly cooled.

*Operation of apparatus in accordance with method*

Initially, as discussed above, clay particles which have been delivered to the pug mill 15 by the scoop 14 are ground within the pug mill 15 by the rollers thereof, and are deposited on the reciprocating screens 17 and 18. The particles of selected size leaving the screens 17 and 18 are delivered by the conveyor 19 to the particle inlet port 20a of the kiln.

In building up the charge of clay bits in the kiln, the clay bits falling through the central opening of the baffle 34 from one side of the baffle are directed toward the opposite side of the baffle 34 therebelow and then fall along the latter baffle toward its central opening and the opposite side of the baffle next below. The clay bits thus travel in a zig-zag path through the kiln or successive paths extending angularly to the longitudinal axis of the kiln. If the conveyor 46 is not operated to remove the clay bits falling to the bottom of the kiln, the clay bits begin to build up in the lower portion 33 of the kiln, blocking the outlet opening of the lowest baffle. The clay bits accumulate in a pile on the baffle with the pile having side walls sloping at the angle of repose for the clay bits. The pile builds up until it blocks the central opening of the baffle next above, after which clay bits begin to pile up on that baffle. This continues until the kiln is full.

It is to be noted that even when the kiln is full and there is a solid column of clay bits extending through the center openings of the baffles 34 from the top or inlet 20a to the bottom or outlet 20b of the kiln, there are annular spaces in the kiln below each baffle adjacent the shells of the dryer and cooler and the walls of the oven that are not occupied by the clay bits. The clay bits are not close enough an approximation to a fluid to allow the pressure of the solid column to cause a rise in the clay bits above the bottom central opening of a baffle around the outer lower side of the baffle. Therefore, there is always an air space beneath the perforated part of each baffle. This helps to prevent the perforations from becoming completely blocked by clay bits as might otherwise occur if the clay bits were pressed against the under surfaces of the baffles. The provision of the air space beneath the perforated part of each baffle is achieved by utilizing a series of vertically spaced downwardly tapering frustro-conical baffles and by locating the baffles in cooperating relation with one another and the adjacent interior wall of the particular kiln section to define the angular space disposed circumferentially of the lower portion of each baffle and outside of the path of particles travelling through the kiln between the inlet port 20a and the outlet port 20b thereof.

During the initial filling of the kiln, the removal conveyor 46 is stopped. However, when the discharge conveyor is started, removal of the clay bits from beneath the lowest baffle starts clay bits to fall from the bottom of the solid column. This containues until the pile on the bottom baffle collapses separating it from the baffle next above. Thereupon clay particles start to fall from the bottom of the solid column terminating in the next above baffle on top of the collapsed pile on the bottom baffle and material on the latter falls through its central opening. Thus all the material on the next to the bottom baffle must fall on top of the pile in the bottom baffle and work its way out through the bottom baffle, effecting a thorough contacting with the air passing through the kiln in the process.

When enough material has fallen from the bottom of the solid column terminating at the next to bottom baffle, the pile on the next to bottom baffle collapses and separates from the solid column terminating at the baffle thereabove. The process of fall, collapse, and further fall is repeated at each baffle, working its way up the kiln. Preferably the lower baffles have greater inclination and outlet opening than those above as already discussed in connection with FIGURE 3, so that the material falls away from each baffle faster than it enters thereby assuring that the converse is not true which would tend to maintain the kiln solid at all times and prevent the desired hourglass-type mixing action. However, baffles of uniform inclination and outlet opening can be used.

The operation of the kiln can best be described starting with a condition in which the kiln is solid with burnt clay bits in the cooler section, preheated clay bits in the burner section, and raw clay bits in the dryer section. After sufficient time has elapsed to bring all the preheated clay bits in the burner up to the desired temperature the discharge conveyor is started and operated long enough to remove from the bottom of the cooler section of the kiln a volume of cooled burnt clay bits equal to the volume of freshly burnt clay bits in the burner section. Since this volume is less than the total volume of clay bits in the cooler section, there will still remain a solid column in the kiln extending upwardly from a certain level in the cooler section through the burner section and dryer section to the top of the kiln. Upon stopping of the discharge conveyor the clay bits continue to work their way down through the kiln, the solid column therein disappearing progressing upwardly from said certain level through the top of the cooler section, the burner section and the dryer section to the top of the kiln. As soon as the solid column has been removed clear to the top of the kiln, the feed conveyor is started and clay bits are fed in at the inlet port 20a, meanwhile the solid column is building up again starting from the bottom since the discharge conveyor is stopped. The solid column finally builds up all the way to the top and the feed conveyor 19 is then stopped. The starting condition is thus achieved.

It will be noted that the freshly burnt clay from the burner section is discharged into the top of the cooler section and is there during the cooking period of the batch of clay in the burner section. This gives it plenty of time to cool. When this batch finally works its way down to the discharge conveyor it will have been thoroughly contacted by the cooling air and brought to ambient temperature. Likewise, the charges of clay bits in the top of the kiln in the dryer section will remain there during the entire cooking time of at least one batch of clay bits in the burning chamber, the volume of clay bits in the dryer section being greater than that in the burning chamber just as the volume of clay bits in the cooling section is greater than that in the burning chamber.

The starting of the discharge conveyor 46 is preferably controlled by a thermostat in the burning chamber as described above, and the stopping is controlled by a timer set to stop the conveyor after the desired volume of material has been removed, but the starting can also be controlled by the timer. If a large enough storage space without baffles is provided above the top baffle of the dryer section, the feed conveyor can be operated continuously.

The kiln is temperature controlled at three points. The temperature of the gas entering the dryer section is controlled by varying the blower speed (i.e., speed of fan 35) thereby controlling the ratio of hot gas from the burning chamber to preheated air from the cooler section. This not only protects the dryer section against excessive temperatures but also protects the burner chamber and cooler section since the temperature of the preheated air depends on the temperature in the passageway and the cooler section. The temperature of the burning chamber 36 is controlled by varying the fuel gas valve 52 in response to a thermostat in the combustion chamber 38. The temperature of the product leaving the burning chamber is controlled by a thermostat therein which starts the discharge conveyor 46 whenever the burnt clay has reached the intended temperature. The conveyor is stopped after a volume of cooled burnt clay equal to that of the freshly burnt clay in the burning chamber has been removed from the kiln.

The clay bits are heated in the burning chamber 36 sufficiently to burn all of the carbonaceous matter, and the temperature may be raised higher toward the point of insipid fusion depending on the desired hardness of the aggregate.

While it has been suggested above that fines are removed or separated from the clay bit aggregate by the screen 44 disposed at the base of the kiln, it is to be understood that fines can be added to the burnt clay aggregate along with finely ground raw clay in suitable proportion if desired, to produce a flexible road base material having particular characteristics. A suitable formula for the flexible road base material is 70% aggregate from the kiln, and 30% fines. The fines need not be burned, but if they are, the triaxial strength of the resultant material is increased. The fines may be composed of any one of the following or equivalent materials or a mixture thereof: (a) crushed aggregate from the kiln; (b) fines from the kiln; (c) ground raw clay passing a hundred mesh screen; and (d) fine sand.

*Particular structural and operational data*

As an example of a typical installation of the type above described, the following numerical specifications are given.

Output: 10 cu. yd. burned clay per hour.

|   | Ft. |
|---|---|
| Cooler section height | 20 |
| Burner section height | 25 |
| Dryer section height | 12 |
| Cooler section shell diameter | 8 |
| Burner section shell diameter | 14 |
| Dryer section shell diameter | 8 |

Gas consumption: 12,000 c.f./hr. natural gas.

| Feed conveyor | 36,750 lb. clay/hr. |
|---|---|
| Aggregate conveyor | 30,300 lb. clay/hr. |
| Kiln blower | 8,000 cu. ft. air/ min. at 5 p.s.i. |

Additional data for this example is given in the following chart wherein reference is made to different points or stations of the kiln as follows:

| Station: | Location |
|---|---|
| a | Clay at top of dryer. |
| b | Clay at top of oven just above baffle 34d. |
| c | Clay lower middle part of oven just above baffle 34c. |
| d | Clay at bottom of cooler adjacent aggregate outlet. |
| e | Air at forced draft below outlet. |
| f | Fuel air at burner inlet. |
| g | Air at bottom of by-pass annulus. |
| h | Gas in combustion annulus. |
| k | Mixture of air and burned gas in bottom of dryer just above baffle 34e. |
| l | Air-gas mixture leaving top of dryer. |

CHART

| Station | a | b | f | c | d | e |
|---|---|---|---|---|---|---|
| Clay: | | | | | | |
| wt./cf. | 127 | | | | 113 | |
| Rate-lb./hr. | 36,750 | 30,300 | | 30,300 | 30,300 | |
| Moisture-lb./hr. | 6,450 | 0 | | 0 | 0 | |
| Temp. °F. | 64 | 350 | | 1,800 | 350 | |
| Sp. heat | .224 | | | | .224 | |
| Pressure: Lb./sq. in. ga. | 0 | 3 | 5 | 3 | 0 | 5 |
| Fuel: Lb./hr. | | | 563 | | | |
| Cu. ft./hr. | | | 12,000 | | | |

| Station | f | g | e |
|---|---|---|---|
| Air: | | | |
| Temp. °F. | 1,140 | 1,140 | 64 |
| Lb./hr. | 11,640 | 37,800 | 37,800 |
| Cu. ft./min. | 8,916 | 19,860 | 8,100 |
| Sp. heat | .254 | .247 | .240 |

| Station | l | k | h |
|---|---|---|---|
| Exit Gas: | | | |
| Lb./hr. | 44,814 | 38,364 | 12,204 |
| Cu. ft./min. | 16,433 | 24,500 | 35,750 |
| Sp. heat | | .27 | .262 |
| Temp. °F. | 350 | 1,380 | 1,800 |

Although the foregoing tables set forth particular operating characteristics, it should be noted that the following miscellaneous factors and/or structural particulars exist in an optimum unit constructed in accordance with the present invention for use with the prescribed method:

Kiln foundation _____ Monolithic concrete slab with under-reamed footing.
Burnt clay aggregate density _____ 104 lb./cu. ft.
Raw clay moisture content _____ 17½%.
Thermal efficiency of kiln _____ 80%.
Flexible road base material _____ 30% natural clay, and 70% burnt clay aggregate.

It will be appreciated that the range of sizes of the product will depend on the feed material. To prevent the baffle perforations from clogging the feed preferably includes no material smaller than the perforations and preferably no small than ¼" diameter. Smaller burnt clay can be produced by crushing the kiln product, and inevitably some fines also collect in the bottom of the kiln below the screen.

If a product having a particular distribution of sizes within a range of sizes is desired, suitable proportions of material of each desired size can be included in the feed, requiring a plurality of sets of screens and either an attendant or a proportioning apparatus to maintain the desired feed mix.

For concrete aggregate, the feed may be composed of material passing a ¾" mesh screen and retained on a ¼" mesh. For a flexible road base aggregate, larger material, e.g., passing only a 1½" screen may be used. A typical distribution of burnt clay suitable as aggregate to be mixed with fines in the ratio of 60–80% aggregate to 40–20% fines for flexible road base material would be:

|  | Diameter Round Opening | | | | | Mesh Spacing | |
|---|---|---|---|---|---|---|---|
| Screen Opening in Inches | 1½ | 1 | ¾ | ½ | ¼ | 1/10 | 1/20 |
| Percent Material Retained | 3 | 21 | 38 | 58 | 79 | 91 | 100 |

After reading the foregoing detailed description, it will be understood that the objects set forth at the outset of this specification have been fully satisfied.

What is claimed is:

1. A method of treating raw clay to form the same into clay aggregate, said method comprising the steps of:
    (a) mining raw clay having a moisture content of less than 25% at a predetermined general location;
    (b) delivering the raw clay having a moisture content of less than 25% to a pre-processing station at said location;
    (c) forming the raw clay delivered to said pre-processing station into clay bits;
    (d) separating selected clay bits formed at said pre-processing station and having a minimum dimension between one-fourth inch and one and one-half inches from the remainder of the clay bits formed at said pre-processing station;
    (e) delivering the selected clay bits to the top of a vertically extending enclosed area at said location and discharging the separated bits into said area;
    (f) directing the clay bits discharged into said area downwardly therein through a first portion of said area and along progressive paths extending angularly to the longitudinal axis of said area;
    (g) passing the clay bits which have traversed said first portion of said area downwardly through a confined space within a second portion of said area below said first portion;
    (h) maintaining a temperature within said confined space of at least 1800° F;
    (i) passing the clay bits which have traversed said confined space downwardly through a third portion of said area below said second portion thereof and along progressive paths extending angularly to the longitudinal axis of said area;
    (j) forcing an inert gas upwardly through clay bits in said third portion of said area, then around but in heat transfer relation to said confined space, and then upwardly through said first portion of said area and any clay bits therein; and,
    (k) controlling the rate at which said clay bits pass through said first portion of said area, said confined space and said second portion of said area relative to the rate at which said inert gas is forced upwardly through said third and first portions of said area such that clay bits which have traversed said first portion of said area have a temperature of at least 225° F. and the clay bits which have traversed said third portion of said area have a temperature below 500° F.

2. The method of claim 1, further comprising the steps of:
    (l) separating the treated clay bits which have traversed said first portion of said area, said confined space and said second portion of said area, from any fines which have been created in said enclosed area and passed therethrough; and,
    (m) mixing predetermined proportional amounts of said treated clay bits, and a material selected from the group consisting of said fines, raw clay and combinations thereof, to form the ultimate aggregate.

3. A method of treating raw clay in a multi-sectional portable vertical kiln to form the same into clay aggregate for use in flexible road beds, said method comprising the steps of:
    (a) digging a clay pit at a first site through a clay strata in close proximity to one part of a proposed roadway;
    (b) erecting said kiln in close proximity to said clay pit such that said kiln has an upper, an intermediate and a lower section;
    (c) mining raw clay from said pit;
    (d) forming the mined raw clay having a moisture content of less than 25% into clay bits;
    (e) selecting those formed clay bits having a selected range of dimensions between one-fourth inch and one and one-half inches and separating the same from the remainder of the formed clay bits;
    (f) drying the selected clay bits in said kiln by forcing pre-heated air upwardly through the upper section of said kiln and selected clay bits therein;
    (g) burning said clay bits in the intermediate section of said kiln vertically below said upper section thereof;
    (h) cooling the burnt clay bits in the lower section of said kiln vertically below said upper and said intermediate sections of said kiln;
    (i) continuing steps (d) through (h) until a desired quantity of burnt and cooled clay bits is obtained;
    (j) disassembling said sections of said kiln, and transporting same to a second site remote from said first site but in close proximity to another part of the proposed roadway; and
    (k) repeating steps (a) through (i) and then step (j).

4. A method of treating raw clay as defined in claim 3 wherein:
    (1) drying step (f) is carried out by raising the temperature of said selected clay bits to between 225° F. and 400° F. with said pre-heated air;
    (2) burning step (g) is carried out by heating said clay bits in said intermediate section to a temperature of between 1800° F. and 2300° F., and
    (3) cooling step (h) is carried out by decreasing the temperature of clay bits in said lower section to a temperature below 500° F.

5. A method of treating raw clay as defined in claim 3 and further including the step of maintaining any water table adjacent said pit at a predetermined level below exposed raw clay in said pit.

6. A method of treating raw clay as defined in claim 3 and further including the step of conveying cooled burnt clay bits from said lower section at a rate which maintains the maximum temperature of clay bits in said intermediate section at between 1800° F. and 2300° F.

7. A method of treating raw clay as defined in claim 6 wherein said drying, burning and cooling steps are carried out simultaneously on different batches of clay bits in said upper, intermediate and lower sections of said kiln, and wherein batches of clay bits are intermittently transferred between said upper and intermediate sections of said kiln and said intermediate and lower sections thereof.

8. A method of forming clay aggregate adjacent a raw clay site comprising the steps of:
 (a) forming raw clay bits having a size sufficient to pass a 1½" screen but not a ¼" screen;
 (b) filling a first enclosed area of a portable kiln at said site with said clay bits;
 (c) heating said clay bits in said first area to a first temperature of between 225° F. and 400° F.;
 (d) transferring at least a portion of the clay bits in said first area which have been heated to said first temperature to a second enclosed area of said portable kiln at said site;
 (e) heating said clay bits in said second area to a second temperature of between 1800° F. and 2300° F.;
 (f) re-filling said first enclosed area with raw clay bits;
 (g) transferring the clay bits which have been heated to said second temperature to a third enclosed area of said portable kiln at said site while simultaneously refilling said second area with clay bits from said first area which have been heated to said first temperature, and refilling said first area with raw clay bits;
 (h) cooling said clay bits in said third area with an air current passing therethrough counter-current to the direction of movement of clay bits into said third area;
 (i) exposing said air current as it leaves said third area to at least a portion of the heat in area to raise the temperature of said air current above said first temperature; and
 (j) using the exposed air current having a temperature above said first temperature to heat the clay bits in said first area.

9. In a continuous method of treating raw clay to form the same into clay aggregate suitable for use in flexible road beds, said method comprising the steps of:
 (a) grinding raw clay into bit-size particles;
 (b) separating those particles having a size within a given range from those having a size outside said range;
 (c) delivering particles having a size within said range into a first uppermost section of an enclosed vertically upstanding area disposed in close proximity to the location where said step (a) is performed;
 (d) drying said particles by passing at least the major portion thereof in a zig-zag path with gravity controlled descent through said first uppermost section of said confined area;
 (e) passing the dried clay-bits by gravity controlled descent into a second mid-sectional area below said first section of said enclosed vertically upstanding area;
 (f) burning said descending clay-bits within said second mid-sectional area for a predetermined period of time and at a predetermined first temperature so that substantially all carbonaceous matter is removed from said clay-bits;
 (g) passing the burnt clay-bits by gravity controlled descent into a third lowermost section vertically displaced from said first and second sections;
 (h) cooling said burnt clay-bits to a predetermined temperature substantially below said first predetermined temperature by passing them in a zig-zag path with gravity controlled descent through said third lowermost section of said confined area;
 (i) forcing air upwardly counter current to the passing clay-bits through said third lowermost section of said confined area and said burnt clay-bits therein, then around said second mid-sectional area in cooling relation thereto, and then upwardly through said first uppermost section and clay-bits therein;
 (j) grading said cooled clay-bits into fines smaller than one-fourth inch and burnt clay aggregate larger than one-fourth inch; and
 (k) removing the burnt clay aggregate to a storage area.

10. In a continuous method of treating raw clay to form the same into clay aggregate suitable for use in flexible road beds, said method comprising the steps of:
 (a) digging a clay pit at a first site through a clay strata in close proximity to a proposed roadway along the right-of-way;
 (b) mining said raw clay from the sides of said pit permitting the freshly exposed clay to air dry before removal;
 (c) forming of the raw clay into clay bits;
 (d) sizing said clay bits into a selected range of dimensions between one-fourth inch and one and one-half inches;
 (e) assembling a vertically extending confined area in close proximity to said clay pit;
 (f) drying said clay bits in a first upper portion of said confined area by passing forced pre-heated air and combustibles upwardly counter current to the clay bits descending by gravity through said upper portion;
 (g) burning said clay bits in a second mid-portion of said confined area vertically below said first portion by the combustion of air and gas under pressure;
 (h) cooling said clay bits in a third lowermost portion of said confined area vertically below said first and second portions by passing forced air upwardly counter current to the clay bits falling by gravity through said third portion;
 (i) conveying said clay bits to a storage area;
 (j) controlling the conveying operation of step (i) in response to the sensing of a predetermined temperature in said clay bits in said second portion of said vertically confined area; and
 (k) controlling the temperature in said second portion by varying the amount of forced air passing upwardly from said third section.

11. In a method of making flexible road base material said method comprising the steps of:
 (a) digging a clay pit along the right-of-way for a proposed roadway;
 (b) erecting a vertically enclosed area in close proximity to said clay pit;
 (c) mining clay bits from the sides of said pit and progressing continuously around the periphery thereof permitting the freshly exposed clay in said pit to air dry before it is mined from said pit;
 (d) reducing the size of said clay bits by agitation and compression;
 (e) screening the reduced clay bits to select a range of sizes between one-fourth inch and one and one-half inches;
 (f) delivering the selected clay bits to the top of said vertically enclosed area and discharging the selected bits into a first upper portion of said enclosed area;
 (g) withdrawing burnt clay aggregate from a second lowermost portion of said enclosed area;
 (h) withdrawing burnt fines from a section of said second lowermost portion of said enclosed area; and
 (i) mixing said burnt clay aggregate, said burnt fines, and additional raw clay from said pit, in predetermined proportions to form said flexible road base.

12. In a method of producing a flexible road base material by treating raw clay in a portable vertical shaft-type kiln having separable vertically stackable sections, the steps of:
(a) erecting first, second, and third sections of said kiln in separable relation to one another;
(b) delivering preselected graded clay bits to said kiln;
(c) drying the clay bits by gravity controlled falling of said clay bits through a first upper area in said first section of said kiln;
(d) heating the clay bits in a second burner area below said first upper area of said kiln to a temperature of at least 1800° F.;
(e) cooling said clay bits by gravity controlled falling of said clay bits through a third area below said first and second areas of said kiln;
(f) passing forced air upwardly counter current to the falling clay bits past said clay bits through said third area, then around said second burner area but in sufficient heat transfer relation to said burner area, and then passing said forced air upwardly past said clay bits in said first upper area of said kiln;
(g) passing a sufficient amount of said upwardly travelling air into said burner area for mixture with fuel gas; and
(h) controlling the temperature of said forced air in said third and said first areas of such kiln to respectively cool and pre-heat clay bits therein.

13. A method of producing aggregate from raw clay found at a proposed roadway site and treated in a portable vertical shaft-type kiln, said method comprising the steps of:
(a) erecting said kiln at a first location along a proposed roadway in close proximity to a supply of raw clay;
(b) mining raw clay having a moisture content of less than 25% from a clay pit;
(c) delivering selected bits of the mined clay having a size range between one-fourth inch and one and one-half inches to the top of said kiln while at least substantially maintaining the moisture content thereof and discharging said clay bits into said kiln;
(d) progressively drying, burning and cooling said clay bits in respective areas of said kiln; and
(e) separating and individually collecting the dried, burnt, and cooled clay bits and the fines formed therefrom during the drying, burning and cooling thereof.

14. The method defined in claim 1 where said step (a) is carried out by mining raw clay from an excavation, which raw clay is disposed at a first level below a layer of top soil and at a second level below a strata of sand and a water table, according to the following steps:
(a) removing the top soil layer from an area of predetermined size;
(b) constructing a wall around the periphery of the excavation so as to prevent the flow of surface water into said excavation;
(c) drilling a plurality of well points around the excavation through the top soil, first clay level and into the sand strata and below the water table;
(d) pumping water from the sand strata and water table;
(e) removing the sand strata below the layer of mined clay; and,
(f) mining the raw clay exposed below the sand strata and above the lowered water table by progressively removing clay from the sides of the excavation around the periphery thereof.

15. The method defined in claim 14 wherein said first-mentioned step (f) is carried out by erecting baffles in said area having an upper surface that has had a refractory fused material in its molten state selected from the group consisting of chromium oxide, aluminum oxide, silicon dioxide, and combinations thereof applied thereto and leak proof resin impregnated therein, and an undersurface coated with a high temperature resistive plastic capable of withstanding temperature of from 600° F. to 2100° F. for extended periods of time and 3700° F. for short periods of time, and passing said clay over said baffles.

References Cited by the Examiner

UNITED STATES PATENTS

| | | | |
|---|---|---|---|
| 1,589,617 | 6/1926 | Austin. | |
| 1,842,664 | 1/1932 | Elsing | 299—11 |
| 2,125,263 | 8/1938 | Ahlmann | 263—53 |
| 2,291,669 | 8/1942 | Weimer et al. | 37—195 |
| 2,412,057 | 12/1946 | Nichols | 263—52 |
| 2,479,132 | 8/1949 | Peale et al. | 299—11 |
| 2,585,116 | 2/1952 | Gronoos | 106—72 |
| 2,590,090 | 3/1952 | De Vaney | 263—52 |
| 2,595,574 | 5/1952 | Grossman | 263—52 |
| 2,627,399 | 2/1953 | De Vaney | 263—53 |
| 2,675,334 | 4/1954 | Gray et al. | 117—132 |
| 2,699,407 | 1/1955 | Martens et al. | 117—132 |
| 2,839,428 | 6/1958 | Laubscher | 117—132 |
| 3,014,836 | 12/1961 | Proctor | 106—288 |

OTHER REFERENCES

Building and Engineering News, San Francisco, California, Sept. 12, 1917, 17th yr., No. 37, page 3, copy in 106–288.

Lea and Desch: The Chemistry of Cement and Concrete, Edward Arnold Ltd., London, 2nd edition; 1956, pages 363–365, 484, 597; TA434L43.

Searle and Grimshaw: The Chemistry and Physics of Clays, Ernest Benn Ltd., London, 3rd edition, 1959, pages 667–670, 674 TP815S45.

FREDERICK L. MATTESON, JR., *Primary Examiner.*

TOBIAS E. LEVOW, *Examiner.*

S. E. MOTT, J. J. CAMBY, *Assistant Examiners.*